Oct. 7, 1952
W. J. JACOBSSON
2,612,728
FLUID PRESSURE REGULATOR
Filed Oct. 2, 1946
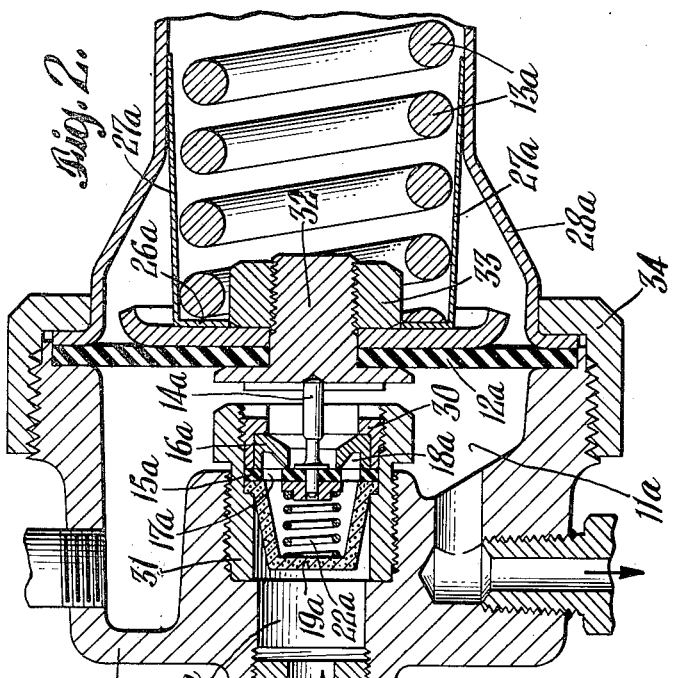
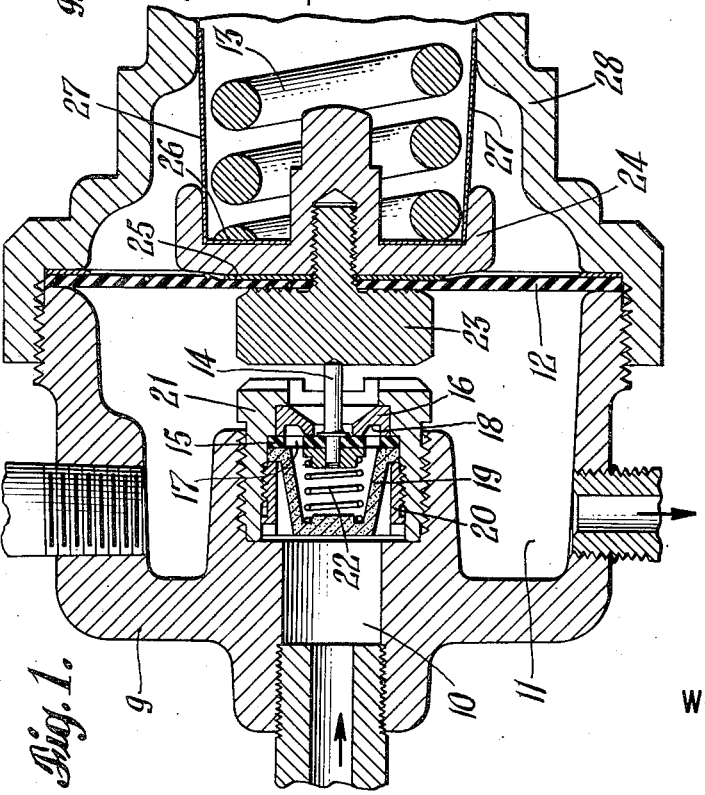
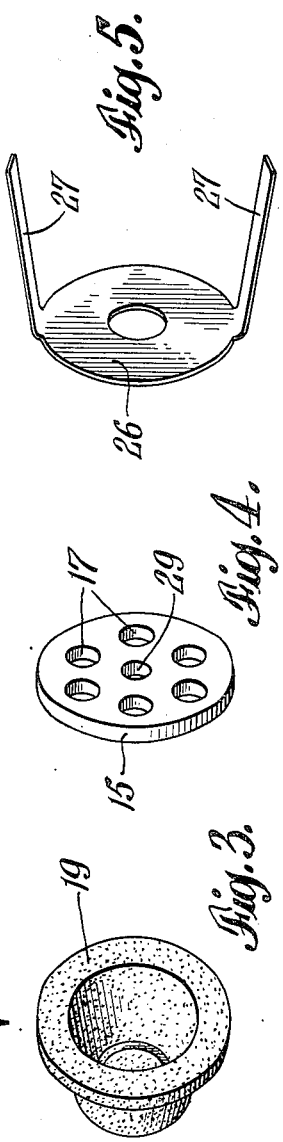
INVENTOR
WILGOT J. JACOBSSON
BY
ATTORNEY Patented Oct. 7, 1952

2,612,728

UNITED STATES PATENT OFFICE 2,612,728

FLUID PRESSURE REGULATOR

Wilgot J. Jacobsson, Plainfield, N. J., assignor, by mesne assignments, to Union Carbide and Carbon Corporation, a corporation of New York Application October 2, 1946, Serial No. 700,692

5 Claims. (Cl. 50—23)

This invention relates to a fluid pressure regulator and has for an object to insure alignment of the movable and stationary parts of its valve whereby such valve has less creep, less danger of leaking, and wear is distributed more uniformly. Another object is to provide such a valve which is sensitive and has more permanent pressure values which are not as much in danger of changing as have the pressure values of some previous valves. Yet a further object is to eliminate hum in such a valve, especially where the hum is in a member balanced between a pair of springs. Still another object is to reduce the danger of particles getting into a valve by providing an improved location and construction for a filter element for such a valve.

It has heretofore been a problem to provide a valve of such type that the movable and stationary parts thereof shall always be in the same parallel position with the axes of both such parts maintained in alignment to insure a tight fit when the valve is closed, keep creep to a small value, and thus insure uniform wear between the cooperating parts of such a valve. Another difficulty has been the danger of a pressure setting changing and requiring frequent adjustment especially in a sensitive regulator valve. In such a valve having its movable element open and balanced between spring forces acting upon such side of such movable part there has been a tendency for hum to be present. The main objection to such hum is not merely auditory but the hazard of rapid wear in the valve parts.

According to this invention these difficulties have been eliminated and an improved fluid pressure regulator valve provided. Specifically a flexible disc constitutes the movable valve element. Its peripheral portion is clamped to maintain the disc always parallel to the stationary element or nozzle and its axis in alignment with the nozzle axis. The disc thus has a permanent guide by means of its clamped edge portion. A slotted sleeve frictionally engages the housing around the spring to produce just enough friction to overcome hum in the disc. A sintered brass filter element having circuitous connecting pores small enough to extinguish a backfire flame and not allow particles larger than .0005" to pass through it is clamped contiguous the valve disc, yet it is cup shaped to extend axially upstream away from the disc far enough to enable the valve closing spring to be inserted within the porous cup.

Referring to the drawings:

Fig. 1 is a longitudinal section through a portion of a gas pressure regulator, illustrating one embodiment of this invention;

Fig. 2 is a longitudinal section through a portion of another regulator, illustrating another embodiment of the same invention;

Fig. 3 is a perspective view illustrating the unitary cup-shaped filter and spring support;

Fig. 4 is a perspective view of the flexible disc constituting the movable element of the valve; and Fig. 5 is a perspective view of the resilient pronged hum suppressor.

As shown in Fig. 1 the pressure regulator includes housing 9 within which is provided a high pressure or supply passage 10 leading to a valve controlling the pressure in the low pressure chamber 11 to which are connected a pressure gauge and an outlet passage. The usual flexible diaphragm 12 has a strong helical spring 13 cooperating therewith to assist in opening the valve against a pressure on the diaphragm 12. Valve opening movement of the diaphragm 12 is transmitted through the valve stem 14 of stainless steel or bronze to the movable valve element, which in this case is a flexible disc 15 of rubber. As is customary in this art the term "seat" is applied to that one of the valve parts which has the softer face. In the present instance the seat is the flexible disc 15 cooperating with the stationary valve part or nozzle 16 preferably of stainless steel. A plurality of symmetrically arranged perforations 17 are located in the flexible disc 15 radially outside of the nozzle 16. A particular material found satisfactory for the flexible disc 15 is a B. F. Goodrich rubber sheet $\frac{1}{16}$" thick known as grade 8380. Perforations 17 lead from the high pressure side of the valve to an annular recess 18 surrounding the nozzle 16.

Having its edge clamped contiguous the peripheral portion of the flexible disc 15 is a filter element 19 of conical or cup shape construction formed of sintered brass known as Porex having circuitous interconnected pores. The particular grade of such filter material is No. 3 or finer filter of particles no larger than .0005" in size. The peripheral flange of the filter cup is clamped contiguous the disc 15 by a threaded sleeve 20. The threads of this sleeve engage corresponding threads in the removable abutment member or bushing 21 or valve mounting bushing of bronze or other suitable material allowing the valve assembly to be removed and inserted in the housing 9 by the screw threads illustrated.

As shown the sleeve 20 holds the nozzle 16 against an annular shoulder within the bushing 21, and also sealingly presses the peripheral portion of the valve disc 15 between the adjoining peripheral portions of the nozzle 16 and the filter element 19. Thus, the disc 15 serves a dual purpose; adjacent its outer edge it acts as a sealing gasket between the nozzle and the lip of the filter element; and, at the nozzle inner edge, it seals off the gas flowing through the nozzle when the usual pressure adjusting screw is turned counter-clockwise to free the pressure adjusting spring 13 of its loading and when delivering pressure exceeds a preset value.

Between and cooperating with the filter cup and flexible disc 15 is a coil spring 22 for seating the valve disc against the nozzle 16. The disc 15 is unseated by movement of the diaphragm 12 being transmitted to the stem 14. For this purpose a diaphragm attaching screw 23 of brass or similar material is provided with a central tapered recess in which the valve stem 14 is centered thus forming a separable socket joint. After the valve is closed the diaphragm 12 and its attaching screw 23 may move to the right or away from the stem 14 in Fig. 1 without the valve stem being moved therewith. Threaded onto this attaching screw 23 is a nut 24 of the general cup shape shown in Fig. 1. A usual diaphragm plate 25 is placed between the nut and diaphragm.

To prevent hum of the valve assembly including the disc 15 and prevent objectionable wear of the valve elements, a hum suppressor of the type shown in Fig. 5 is held by the spring 13 contiguous the nut 24 while its spring prongs 27 frictionally engage the inner surface of a cup 28 for the housing, providing just enough friction to suppress any hum without constituting an objectionable drag upon the movable valve element. This hum suppressor 26 and its spring prongs are made of an appropriate resilient material such as Everdur. The cap 28 is threaded onto the housing 9 to clamp the peripheral portion of the diaphragm 12 between them, as shown in Fig. 1.

A central perforation 29 in the disc 15 permits the valve stem 14 to extend through the disc 15, the stem having an enlargement contiguous the face of the disc with which the nozzle 16 cooperates whereby the filter and valve closing spring press a backing up member against the disc so that the stem 14, valve seat, and backing up member operate as a unit. The valve seat is strictly the portion of the disc 15 between the central hole 29 and surrounding holes 17 which portion cooperates with the nozzle 16 when the valve is closed. This seat closes perfectly when the screw 23 is disengaged from the stem. This seat portion is thus flexibly guided by the portion of the disc 15 outside the seat and inside the clamped edge. This guiding element tends to realign the seat automatically should any eccentric pressure be applied to the seat portion of the disc during operation. In another sense slight misalignment of the valve seat in opening and closing is not serious due to the yieldable mounting of the valve seat because this mounting with the spring 22 tends to accurately align and center the valve seat on closing.

This valve may be designated as one having a self-aligning valve seat, which is an improvement on this disclosed in the prior application of Jacobsson et al., Serial No. 592,212, filed May 5, 1945, for "Aircraft Breathing Oxygen Regulators." By the term "self-aligning seat" is meant one of at least a slightly yieldable material whose sealing surface with no effort becomes parallel with its cooperating or mating sealing surface when moved into contact and irrespective of whether or not the stationary sealing surface may be axially aligned with the valve axis and precisely normal or at right angles thereto. The flexure of the diaphragm 15 may be regarded as tilting to conform to any slight tilt the nozzle 16 may have, and it may be seen from the drawing that such a tilt is about a point in the general plane of the diaphragm 15.

The embodiment illustrated in Fig. 2 has many corresponding parts numbered similarly to those in Fig. 1 except that the small letter $a$ is added in connection with each such corresponding part in this Fig. 2. Many of the parts are of different shape however. The valve stem 14$a$ has a slightly different shape as has also the conically tapered cup shape filter member 19$a$. Instead of having a disc 15$a$ and filter element 19$a$ clamped by a removable sleeve on the upstream side of the valve, such threaded clamping sleeve 30 is located on the downstream or low pressure side of the valve. The valve mounting bushing 31 as also shown is of a different construction. However, in both embodiments the valve mounting bushing 21 or 31 is removable from the housing to permit inspection and repair of the valve assembly. The diaphragm attaching screw 32 is of somewhat different shape, the same being engaged by a nut 33 located within the convolutions of the spring 13$a$. The cap 28$a$ against which the prongs 27$a$ of the hum suppressor frictionally contact, is shown as being made of thinner pressed or stamped metal clamped against the diaphragm 12$a$ by the screw clamp 34 threaded on the housing 9$a$.

Sintered brass filter elements of the type described are adapted to arrest a backfire flame by causing such flame portions to enter the numerous pores and be quenched as the flame portions are bent through the numerous tortuous interconnected pores. A filter element of the type described causes a pressure drop across the filter element of about 5 pounds when the flow is at the rate of 1000 cubic feet of gas per hour under 100 pounds pressure. This filter element 19 is not too gas permeable but has such a degree of permeability that the filter is adapted to delay a high pressure gas surge sufficiently to protect the yieldable material of which the valve seat and disc are composed from being injured by heat in event of a sudden surge of high pressure gas thereon. The seat is further protected from such injury by the ability of the filter element to absorb heat, such filter is heat conductive and also the pressure drop referred to effects a slight expansion of the gas and therefore a cooling action.

Among the advantages of this invention may be mentioned the less likelihood that the valve has to leak and the 25% to 50% less creep, as well as more uniform wear, all due to the planes of the ends of the nozzle and valve seat being parallel and coinciding when the valve is closed. The creep is also low due to the valve seat making contact with all the nozzle in a short time on closing as a result of the yieldable mounting of the seat. The present valve is more sensitive and has more permanent pressure values due to the edge portion of the flexible disc being clamped to constitute the outer perforate portion of the disc a seat guide. Permanent pressure values are also due to the stem 14 having no other than straight line motion when centered in the socket shown for it in the screw 23. The stem being separate from the diaphragm attaching screw permits proper seating of the valve without precision alignment of the valve seat disc and the diaphragm. The permanent flexible valve seat disc enables adequate flow of either liquid or gas through the valve and regulator. The hum suppressor eliminates rapid wear in the valve seat which might otherwise occur were hum allowed to continue, yet the spring prongs of the hum suppressor may be adjusted to give only enough friction and not substantially more than enough to eliminate the hum. Locating the filter element next to the valve precludes particles of scale or dirt which might fall off from the walls of the housing between the filter and valve from getting into the valve.

I claim:

1. A fluid pressure regulator having a casing comprising an inlet and outlet and a port between said inlet and said outlet, a movable valve member controlling the flow of fluid through said port and coaxial with the latter, said valve member being the inner portion of a resilient diaphragm clamped adjacent its periphery, a spring bearing against one side of said valve member and pressing the latter toward said port, a stem having a shoulder bearing against the other side of said valve member, said stem being guided by said valve member, having one end thereof extending axially through said valve member and having the other end thereof projecting axially through said port and being of substantially smaller diameter than said port, and a pressure responsive diaphragm coaxial with said port and loosely connected to said stem, whereby the construction and arrangement is such that the loose connection of said stem to said diaphragm and the space provided between the port and stem permits automatic realigning of said valve member and said stem axially relatively to said port during the operation of said regulator.

2. A fluid pressure regulator having a casing provided with an inlet passage, an outlet passage, and a nozzle between said passages, a movable valve member controlling fluid movement through said nozzle, said valve member being an inner portion of a resilient diaphragm clamped adjacent its periphery, a valve closing spring applying pressure against one side of said diaphragm and pressing the latter toward said nozzle, a pressure responsive diaphragm generally parallel with and spaced from the valve diaphragm, a stem of smaller diameter than said nozzle extending therethrough between said diaphragms supported and yieldably guided by one of them without any rigid guide bearing for said stem for opening the valve diaphragm by flexing it away from said nozzle under flexure of the pressure responsive diaphragm toward the valve diaphragm, that one of said diaphragms by which the stem is not supported having a plate contiguous to it provided with a tapered recess substantially coaxial with said valve diaphragm and stem into which the unsupported end of said stem is separably socketed while able to tilt slightly with respect thereto as the valve diaphragm may tilt in closing against said nozzle, whereby creep is reduced and the space between the stem and nozzle, the yieldable guide and support for the stem, its separable and socketing connection with one of said diaphragms, and its freedom from having any rigid bearing, permit tilting either or both of said stem and valve diaphragm and reduce friction, enabling said valve diaphragm movement to be sensitive to pressure changes on the pressure responsive diaphragm.

3. A regulator according to claim 2 in which said inlet passage leads fluid to the side of said valve diaphragm away from said nozzle and that valve diaphragm is provided with a perforate portion radially outside the nozzle and radially within the clamped peripheral portion of the valve diaphragm.

4. A regulator according to claim 2 in which the stem is supported and guided by the valve diaphragm.

5. A regulator according to claim 2 in which a cup-shaped filter has its periphery clamped contiguous said valve diaphragm and the end of the valve closing spring remote from the valve diaphragm cooperates with said cup-shaped filter.

WILGOT J. JACOBSSON.

REFERENCES CITED

The following references are of record in the file of this patent:

UNITED STATES PATENTS

| Number | Name | Date |
| --- | --- | --- |
| 1,053,315 | O'Dowd | Feb. 18, 1913 |
| 1,410,089 | Wilkins | Mar. 21, 1922 |
| 1,679,826 | Jenkins | Aug. 7, 1928 |
| 1,825,637 | Ricker | Sept. 29, 1937 |
| 2,066,554 | Bowen | Jan. 5, 1937 |
| 2,103,576 | Dockson | Dec. 28, 1937 |
| 2,297,817 | Truxell | Oct. 6, 1942 |
| 2,335,824 | Dillman | Nov. 30, 1943 |
| 2,359,386 | Reinsch | Oct. 3, 1944 |
| 2,398,503 | Paasche | Apr. 16, 1946 |
| 2,524,231 | Mott | Oct. 3, 1950 |